(12) United States Patent
Asterlin et al.

(10) Patent No.: US 6,572,724 B1
(45) Date of Patent: *Jun. 3, 2003

(54) METHOD FOR PRODUCING AN IMPROVED SEAMLESS BAG BY HEAT SEALING

(76) Inventors: Gunther E. Asterlin, 100 Anchor Rd., P.O. Box 735, Michigan City, IN (US) 46360; H. William Morgan, 100 Anchor Rd., P.O. Box 735, Michigan City, IN (US) 46360

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 404 days.

(21) Appl. No.: 07/848,856

(22) Filed: Mar. 10, 1992

(51) Int. Cl.[7] .............................................. B32B 31/00
(52) U.S. Cl. ....................... 156/251; 156/184; 156/250; 156/191; 156/186; 156/252; 156/221; 156/258; 156/293
(58) Field of Search ................................ 156/251, 515, 156/217, 311, 184, 186, 250, 185, 191, 252, 258, 221, 293

(56) References Cited

U.S. PATENT DOCUMENTS

| | | | | |
|---|---|---|---|---|
| 3,847,708 A | * | 11/1974 | Takahashi et al. | 156/250 |
| 4,043,858 A | * | 8/1977 | Dantowitz | 156/251 |
| 4,157,719 A | * | 6/1979 | Deoskin | 156/250 |
| 4,392,257 A | * | 7/1983 | Furga | 156/251 |
| 4,396,449 A | * | 8/1983 | Tumminia | 156/251 |
| 4,464,219 A | * | 8/1984 | Colombo et al. | 156/251 |
| 4,485,295 A | * | 11/1984 | Kellermeyer | 156/251 |
| 4,487,599 A | * | 12/1984 | Bendig et al. | 156/251 |
| 4,490,207 A | * | 12/1984 | Achelpohl | 156/251 |
| 4,502,906 A | * | 3/1985 | Young et al. | 156/251 |
| 4,526,639 A | * | 7/1985 | Reimann | 156/251 |
| 4,555,290 A | * | 11/1985 | Graetz et al. | 156/250 |
| 4,582,555 A | * | 4/1986 | Bower | 156/250 |
| 4,657,792 A | * | 4/1987 | Ausnit | 156/251 |
| 4,867,829 A | * | 9/1989 | Moriya et al. | 156/251 |

* cited by examiner

Primary Examiner—Merrick Dixon
(74) Attorney, Agent, or Firm—James D. Hall

(57) ABSTRACT

An improved method and apparatus for heat sealing bags having a mandrel with protruding needles for holding the bag material when the material is wrapped around the mandrel. The mandrel has a ridge for allowing easy penetration of an upwardly angled hot blade between the two overlapping ends of the bag. An apparatus composed of three hot blades of which the two outside blades enter the bottom of the bag and expand outward contacting an inner perimeter of the bag when the middle blade moves forward. The blades then retract and the bag is then fused together by pressure bars and cut by heat trimmers.

7 Claims, 9 Drawing Sheets

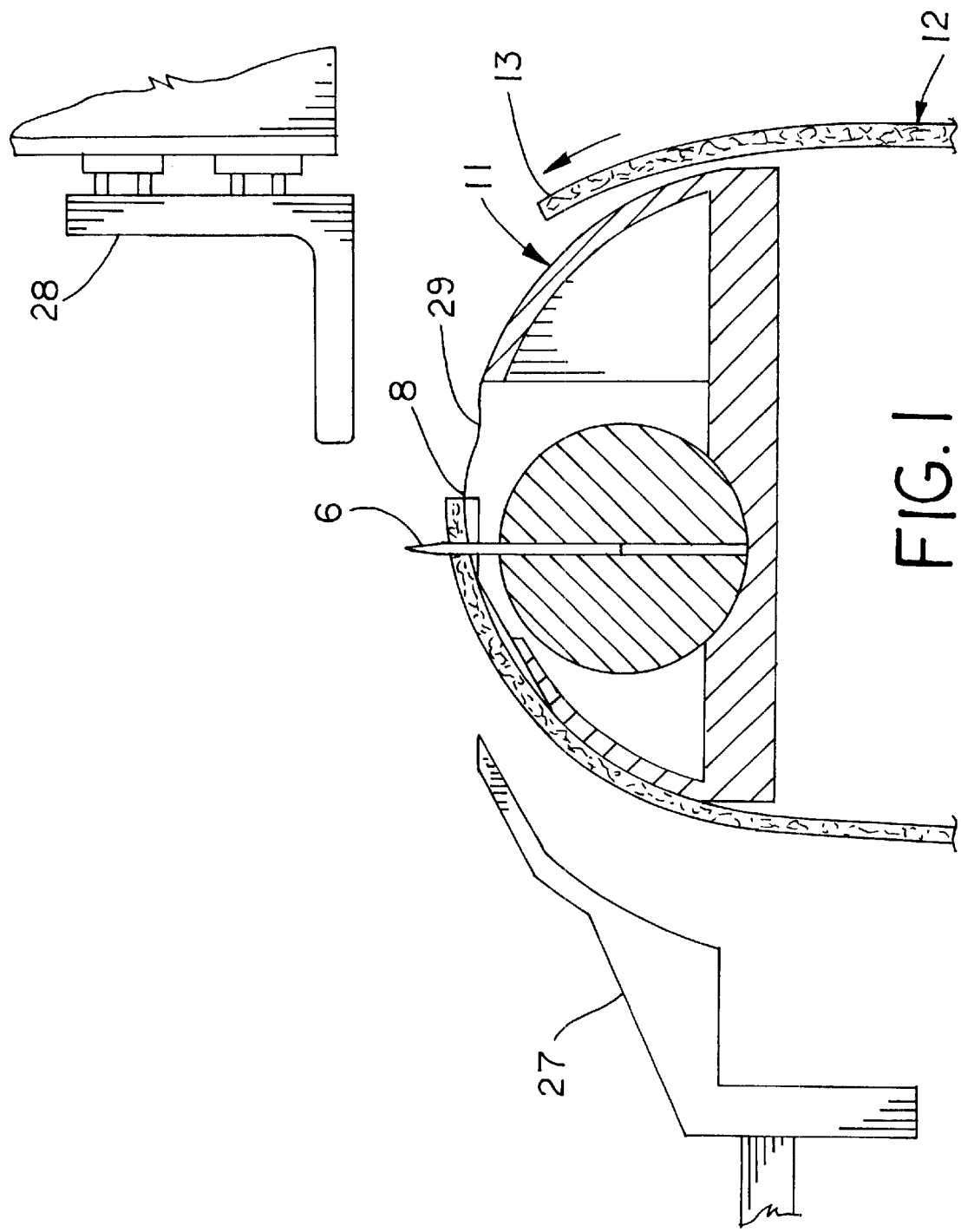

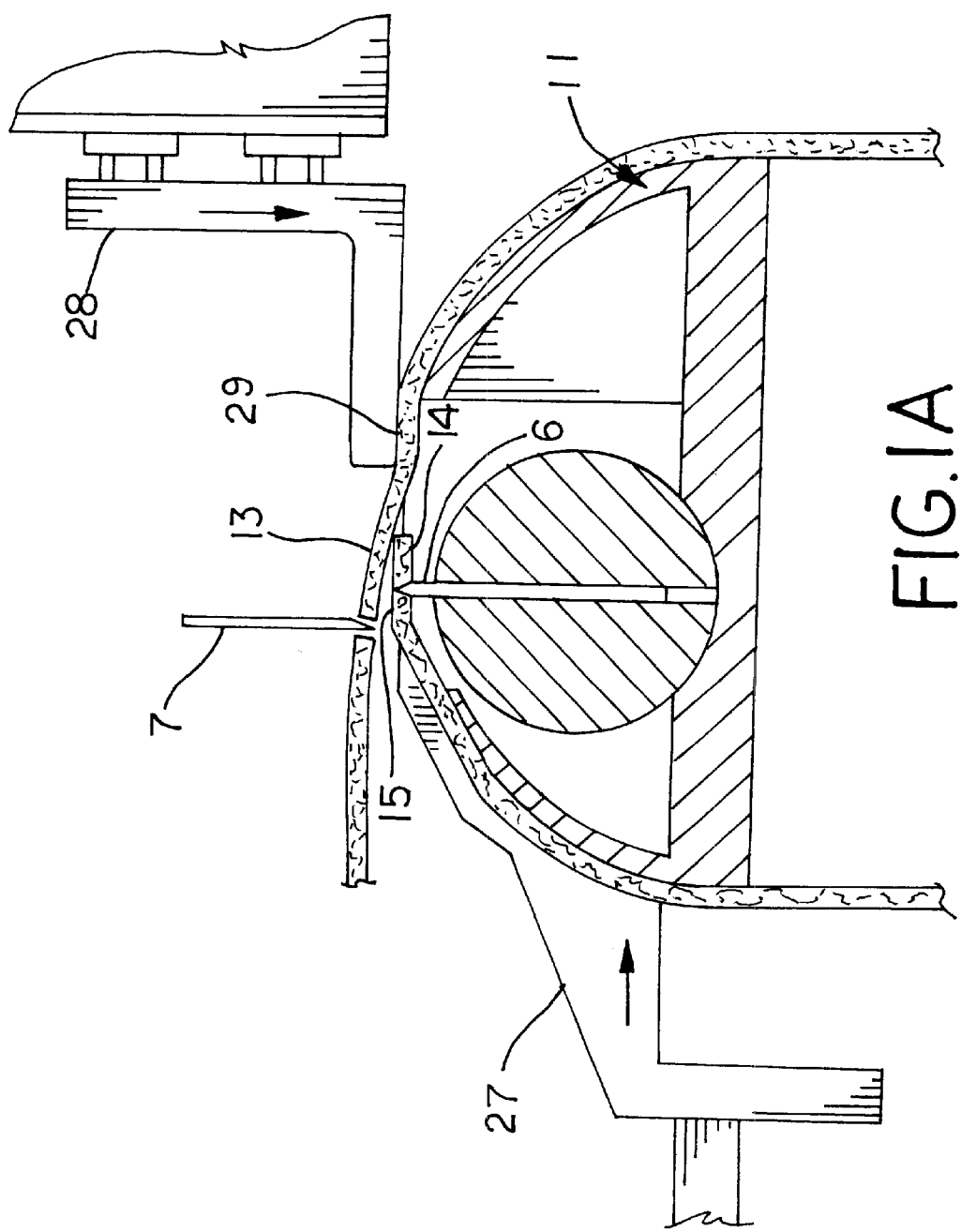

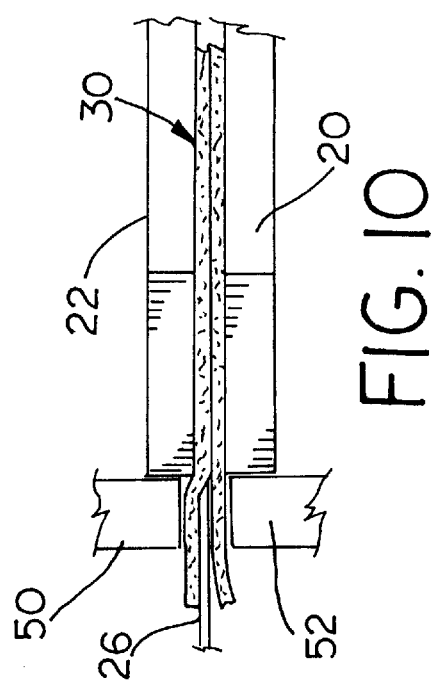
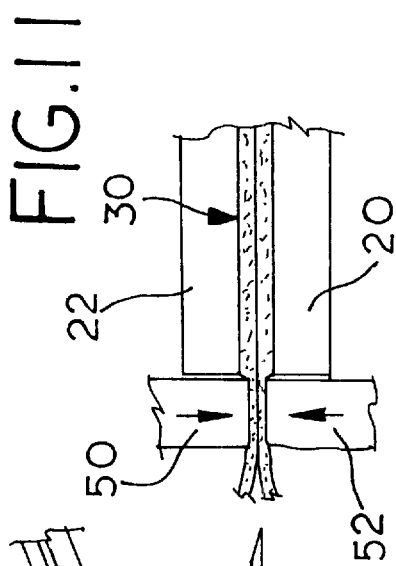
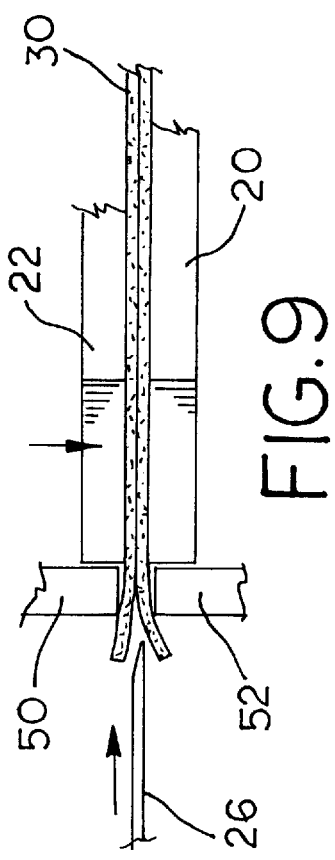
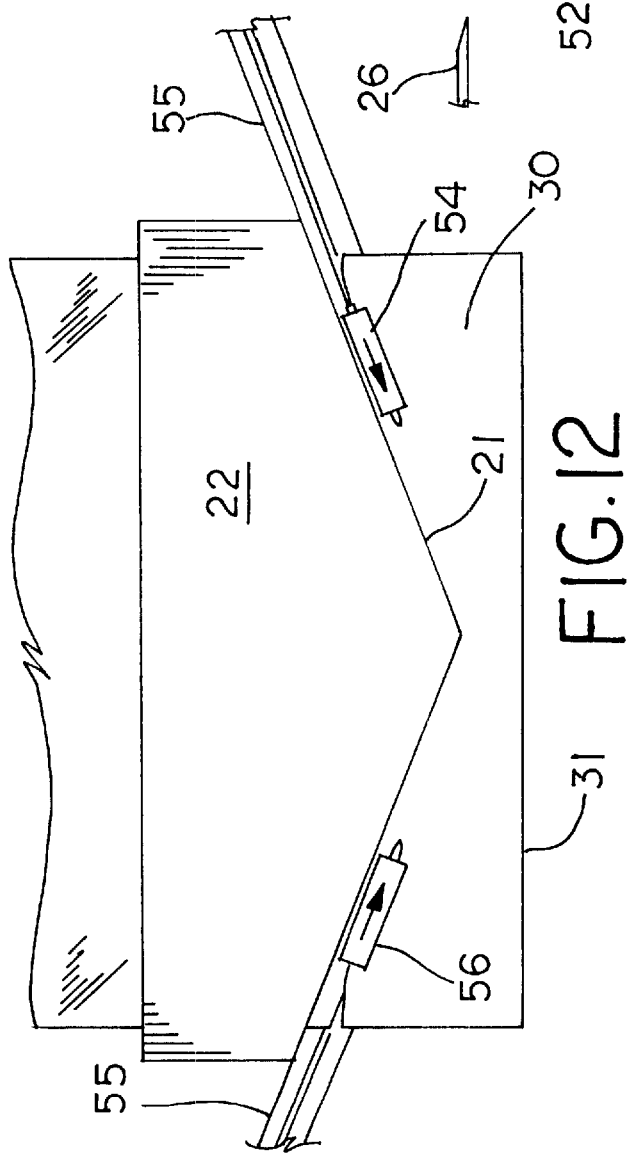

METHOD FOR PRODUCING AN IMPROVED SEAMLESS BAG BY HEAT SEALING

FIELD OF THE INVENTION

This invention relates to an improved method and apparatus for sealing of filter bags.

BACKGROUND OF THE INVENTION

Normally, the fluid pervious bag material is wrapped around until the ends of the material overlap each other to form a cylinder. The ends are then sewn or bonded together. Often a mandrel is used to aid in wrapping the material. The open bottom end of this formed cylindrical shaped bag is then cut to form a V-shape and then sewn. However, such stitching lowers the efficiency of the filter bag around the needle holes and increases the likelihood of leakage under high operating pressure.

In some methods of manufacture, a hot blade partially cuts the cylindrical plastic fibrous bag material at the edge of the open bottom to allow the blade to penetrate several inches into the bag. The separated layers of the bag contact the blade and are partially melted. The separated melted layers are pressed together and fused. The bottom of the bag is then cut into a V-shape. The length of the hot blade must be sufficiently long to ensure that all the area of contact between the layers is partially melted to completely seal the bottom. However, the seal is very weak where the bag material is first cut and heated by the hot blade. At these areas, the melted material forming the adhesive which seals the bag is less thick and weaker than the material itself.

SUMMARY OF THE INVENTION

This invention improves both the side wall and end wall sealing of the bag.

The invention includes a mandrel having a ridge that creates an opening for the insertion of the hot blade between the overlapping longitudinal ends of bag material composed of micro-woven filaments when the material in sheet form is wrapped around the mandrel. The blade is tapered so that it contacts and heats all of the bag material at the overlapping ends. Protruding needles from the mandrel hold the bag material at the overlapping ends until the ends are clamped and fused together. Two exterior hot blades then enter the open bottom of cylindrical bag and expand outwardly with a wedge shaped hot blade being inserted between them. Pressure bars clamp down and laterally fuse the bottom in a generally V-shaped configuration as the three hot blades are withdrawn. A pair of heat cutters or trimmers cut the bottom of the bag along the V-shaped fusion.

It is an object of this invention to provide an improved mandrel apparatus for sealing the side of a filter bag.

It is another object of this invention to provide a mandrel such that the bag material may be securely wound around it.

It is another object of this invention to provide a blade apparatus that forms a stronger seal on the bottom of a filter bag.

Other objects will become apparent upon a reading of the following description.

BRIEF DESCRIPTION OF THE DRAWINGS

FIG. 1 is an elevated partial cross-sectional view of the mandrel and related parts with the bag material being shown wrapped around the mandrel.

FIG. 1A is an elevated view like FIG. 1 but showing the hot knife cutting the bag material from the roller forming a sheet.

FIG. 6a is an end view of the blade apparatus as seen from line 6a—6a of FIG. 6.

FIG. 9 is a fragmentary side view of the bag material showing blade apparatus before insertion into the bag.

FIG. 10 is a fragmentary side view like FIG. 9 but showing the blade apparatus in its extended position.

FIG. 11 is a fragmentary side view like FIG. 10 but showing the bag material being fused together by pressure bars.

FIG. 12 is a top plan view of the fused bag being cut by heated trimmers.

DESCRIPTION OF THE PREFERRED EMBODIMENT

Figure 2:
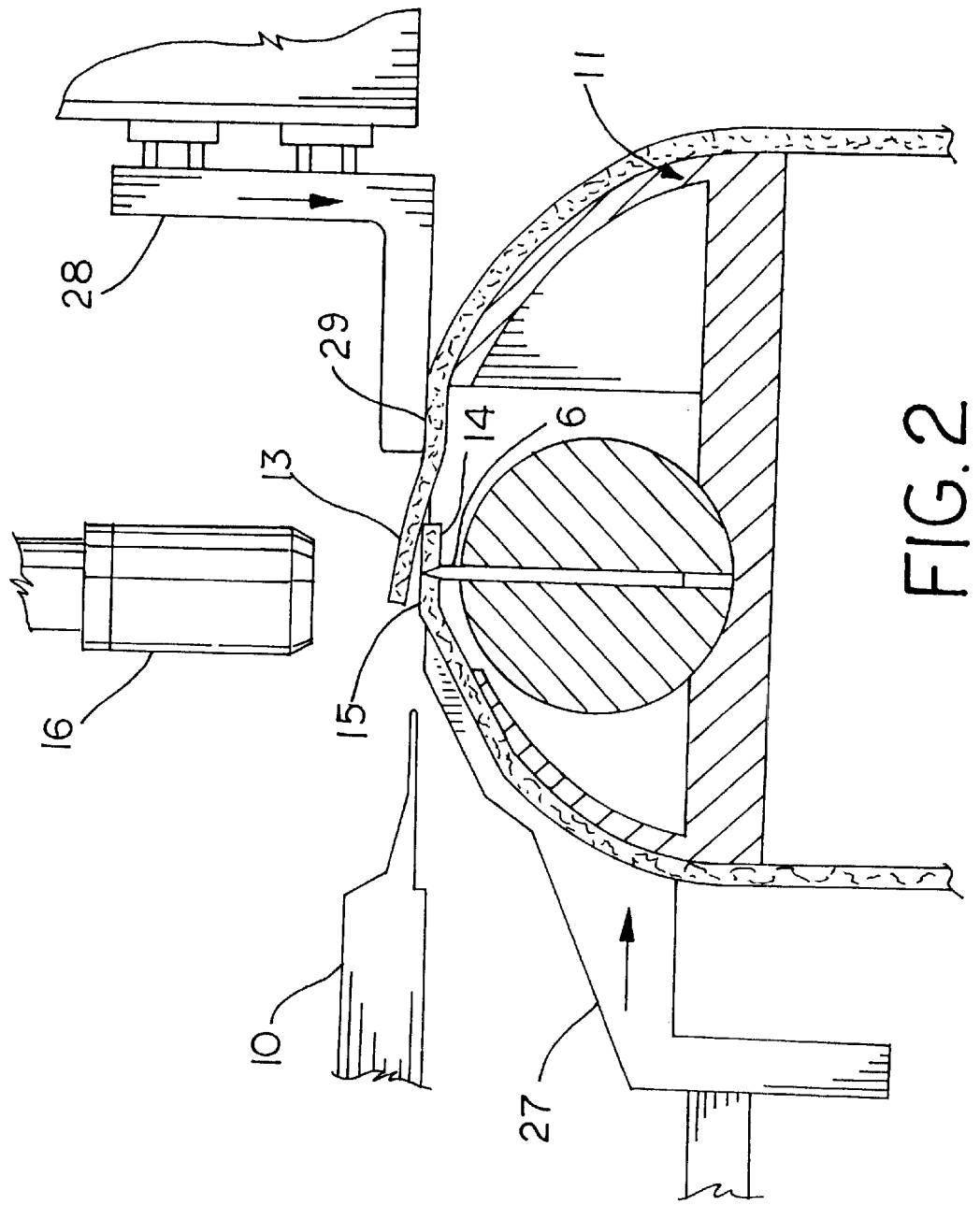
FIG. 2 is an elevated view like FIG. 1 but showing the pressure bar and hot blade and the bag material being secured with its side edges overlapped.

The preferred embodiment herein described is not intended to be exhaustive or to limit the invention to the precise form disclosed. It is chosen and described to explain the principles of the invention and its application and practical use so that others skilled in the art may follow its teachings.

Bag material 12 composed preferably of micro-woven plastic filaments is fed from a roller (not shown) onto a mandrel 11 with a longitudinal row of protruding needles 6 piercing through the leading edge 14 of the material as shown in FIG. 1. The needles hold the material 12 as the material winds around the mandrel 11 with needles 6 contacting opposite edge 13 of the material, eliminating the need for a clamping stock and allowing for minimum material usage.

The material is cut from the roller at edge 13 with hot knife 7 and thus forming a sheet of material. The mandrel includes a ridge 8 for enlarging the-gap formed between the overlapping upper edge layer 13 and lower edge layer 14 of the material so that a tapered hot blade 10 can easily penetrate the gaps and heat all of the overlapping material without burning through its upper layer 13. The material is then held by an upper clamp 28 and a lower clamp 27 as illustrated in FIG. 2. The upper clamp 28 presses behind the edge of the upper layer 13 at a depression or indentation 29 in the exterior of the mandrel to flex the upper layer upwardly and create a gap 15 between the two layers.

Figure 3:
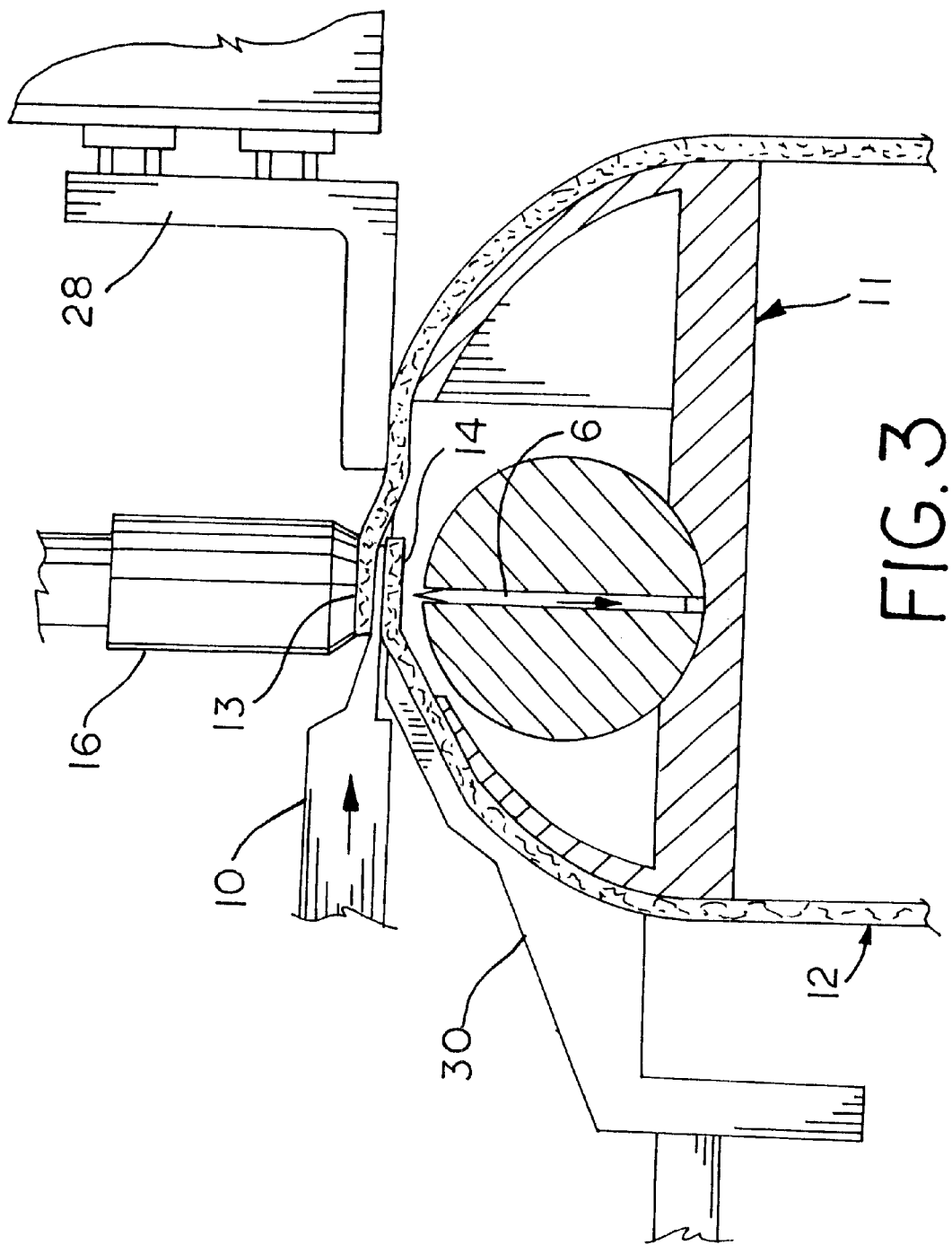
FIG. 3 is an elevated view like FIG. 2 but showing the hot blade inserted between the pressed overlapping edges of the bag material.
Figure 4:
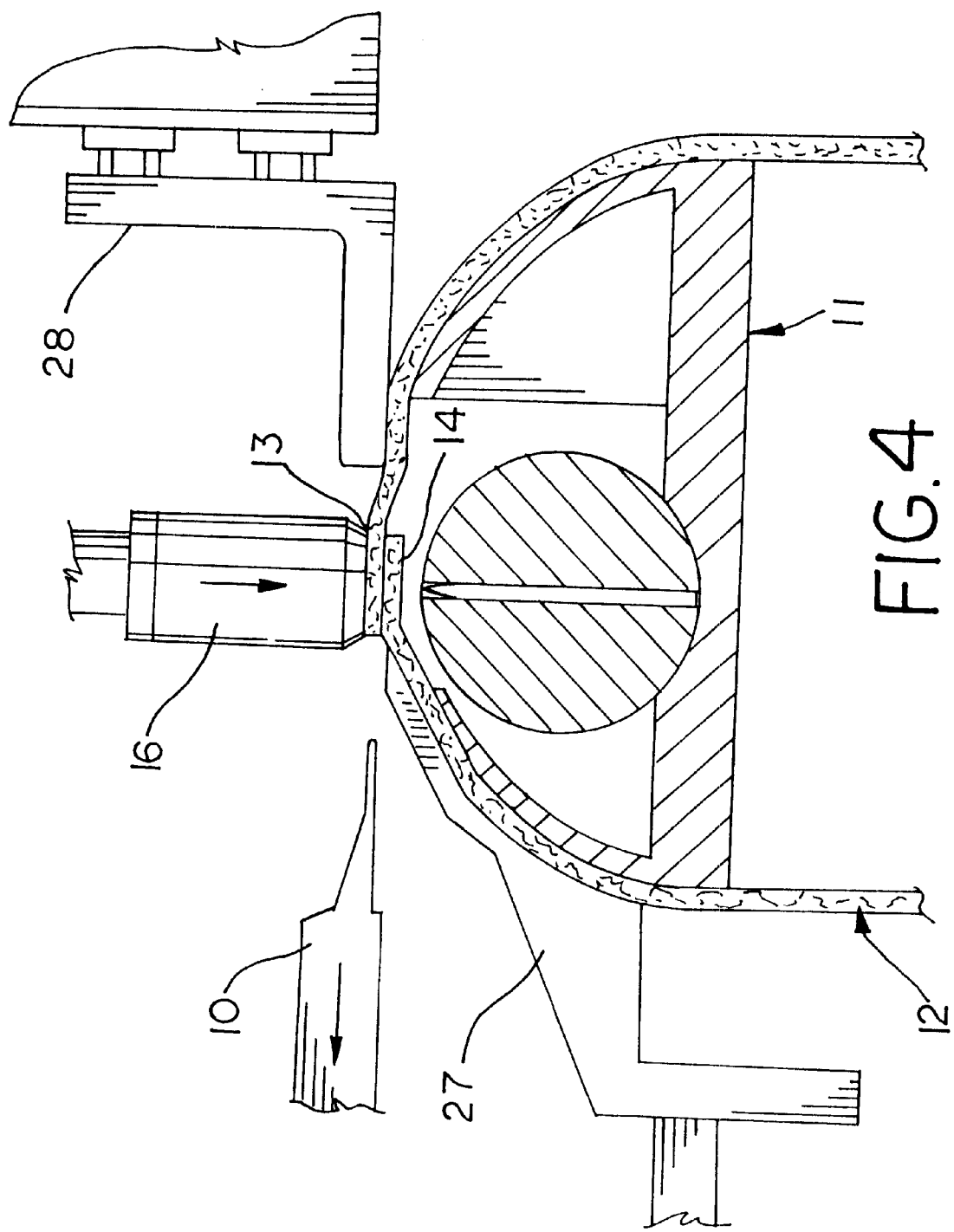
FIG. 4 is an elevated view like FIG. 3 but showing the overlapping ends of the bag material being fused together.
Figure 5:
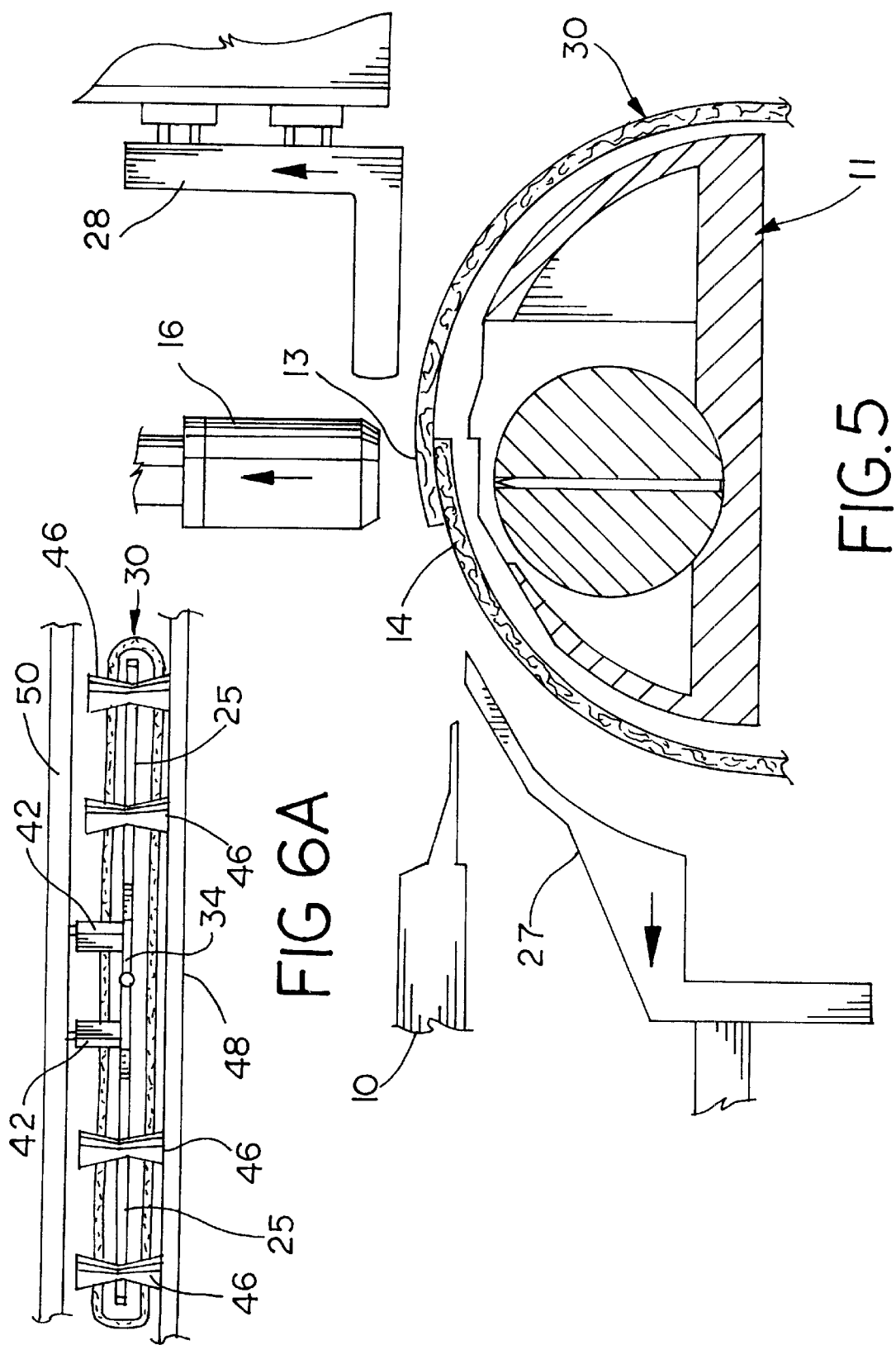
FIG. 5 is an elevated view like FIG. 4 showing the fused bag material in unclamped cylindrical form.

After material 12 in sheet form is wound and clamped about mandrel 14 as seen in FIG. 2, the needles 6 retract and the tapered blade 10 is inserted into gap 15 between the layers. The overlapping bag layers 13, 14 are pressed by a longitudinal pressure bar 16, causing the layers to be urged against the heated blade 10 as shown in FIG. 3 along the length of the cylindrical bag to partially melt the layers. The blade 10 is angled so as to fit the shape of the gap for contacting a substantial portion of the surfaces on the overlapping bag layers 13, 14. The layers 13, 14 are then fused together at their overlapping areas by bar 16 compressing them together as blade 10 is withdrawn as seen in FIG. 4. The clamps 28, 27 and pressure bar 10 release their hold upon the bag material and mandrel 11 is lowered as shown in FIG. 5 to allow the cylindrical bag 30 to be slid over the mandrel.

Figure 6:
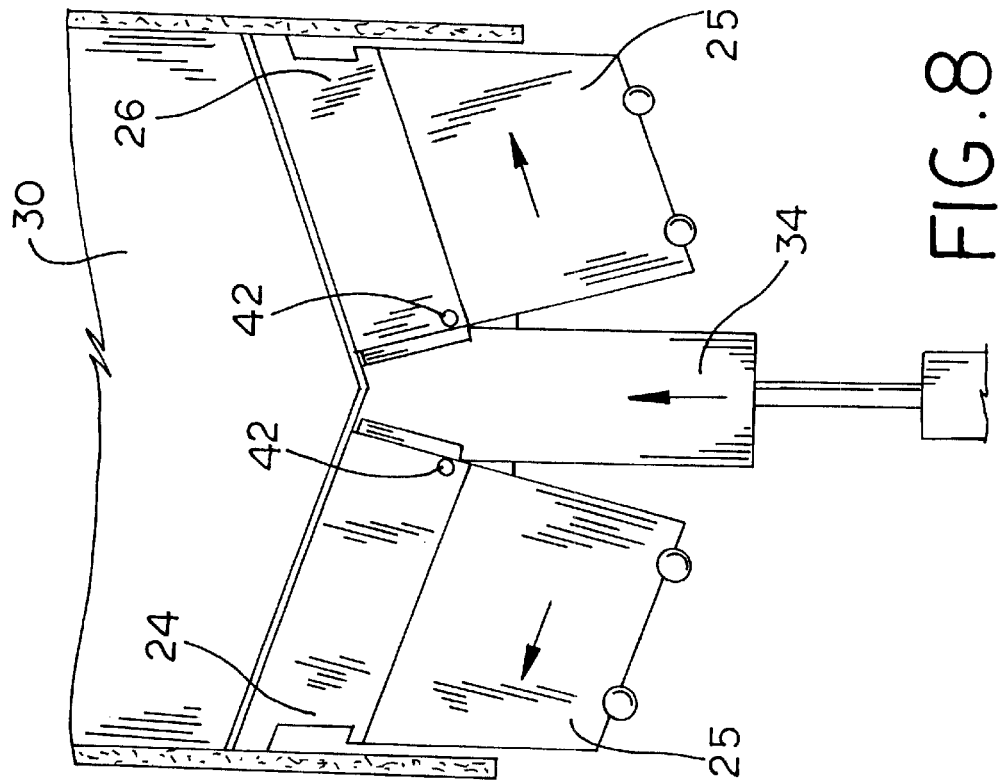
FIG. 6 is a top plan view of the blade apparatus in its retracted position inserted into the open end of the cylindrical bag material.

Next, grippers (not shown) pull the material from the mandrel and across a table 20 having a V-shaped end edge 21. A chevron-shaped plate 22 presses bag 30 behind its lower opening 31 to separate its edges to allow exterior blades 24 and 26, which when retracted together are smaller in width than the width of bag opening 31, to enter the bag as illustrated in FIG. 6, 6a, 7, and 9. As seen in FIG. 6, the inner sides of blades 24 and 26 are slanted such that a wedge-shaped space is formed between the two blades. A V-shaped center blade 34 is fitted adjacently between the inner sides of blades 24 and 26 into the wedged-shaped space. Each blade 24, 26, 34 have a heat resistive blade holder 25 covering a portion of the blade. An air cylinder 40 is connected to center blade 34 for urging it between blades 24, 26.

Figure 8:
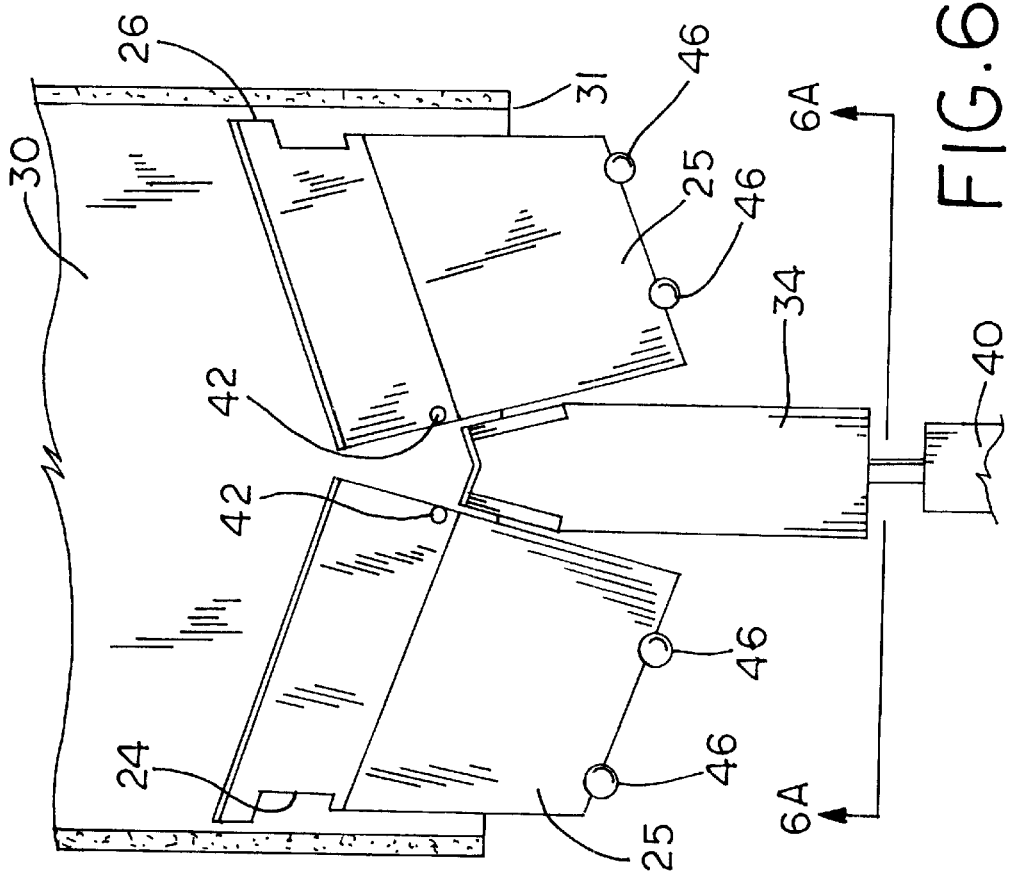
FIG. 8 is a top plan view like FIG. 6 showing the blade apparatus in its extended position.
Figure 7:
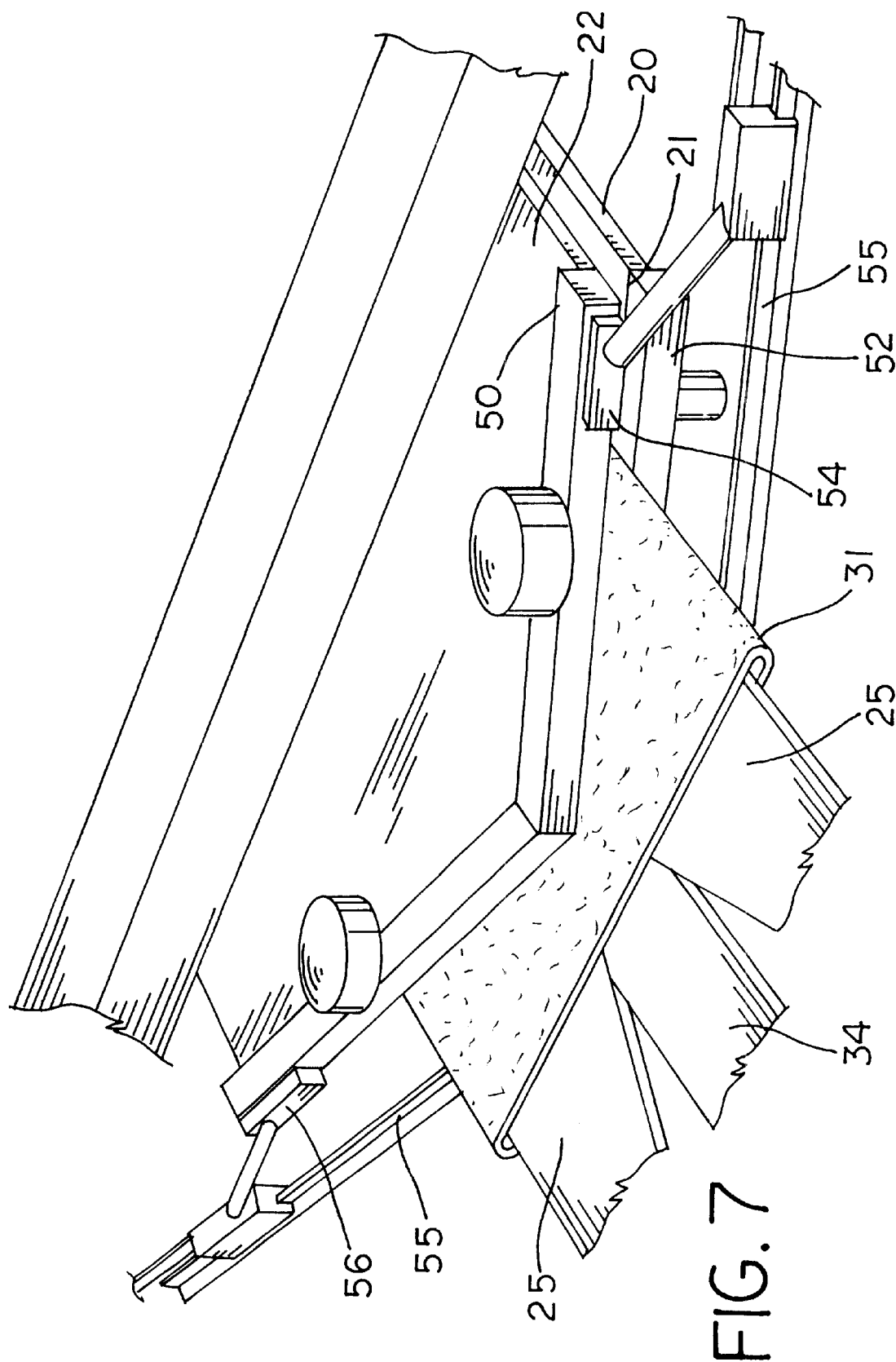
FIG. 7 is a perspective view of the blade apparatus with the clamping bars inserted into the bag and in its retracted position.

The exterior blades 24, 26 first enter into the bag 30 in their retracted position as illustrated in FIG. 6. The center blade 34 then moves forward engaging cam rollers 42 which protrude from the exterior blades expanding blades 24, 26 laterally as shown in FIG. 8 so that the outside edges of the blades contact the inner surface of the bag. Located below blades 24 and 26 is a plate 48 that is also connected to the air cylinder 40 for movement with center blade 34. Cams 46 are mounted upon plate 48 with a pair of cams engaging blades 24 and 26 to assist in moving and guiding the blades outwardly with respect to the transverse axis of the bag as center blade 34 moves forwardly between the exterior blades.

The center blade 34 also has a V-shaped insert at its inner edge that forms with the edges of blades 24, 26 the lower V-shaped outline of the finished bag, corresponding to the underlying V-shaped edge 21 of the underlying table 20.

The center blade 34 in conjunction with the exterior blades 24, 26 melts a V-shaped heat seal around the perimeter of the inner surface of the bag when positioned as seen in FIG. 10. Each blade 24, 26, 34 is heated by a cartridge heater, which is a heat-producing ceramic wire fitted within a groove of the blade. The wires are resistively heated by an electrical power source. After the blades 24, 26, 34 heat the bag, they then retract in unison. Pressure bars 50 and 52 then press the heater bag layers 13, 14 together along the V-shaped heated area, sealing the bag as seen in FIG. 11.

A pair of heated trimmers 54 and 56 are urged along guide rails 55 by a cylinder and thermally cut the bag along the edge 21 of the table as shown in FIG. 12. The heat trimmers are heated by a cartridge heater similar in construction as that used to heat the blades. The heating element of the heater securely fits into a hole bored into each trimmer.

It is understood that the above description does not limit the invention to the given details, but may be modified within the scope of the following claims.

We claim:

1. A method of forming a bag from a sheet of material comprising the steps of:
    a) providing a mandrel having a plurality of protruding needlelike members, said mandrel of a general longitudinal shape approximately resembling the longitudinal shape of the bag;
    b) wrapping said bag material having opposite edges around said mandrel;
    c) initially piercing at least one edge of said bag material with said needlelike members to anchor the material to the mandrel until said edges are adjacent to each other;
    d) securing said bag material at said edges onto said mandrel by clamping members;
    e) retracting said needle-like members from said bag material;
    f) securing said edges of said bag material together.

2. The method of claim 1 wherein step c) includes overlapping said edges with said needlelike members piercing both the edges.

3. A method for sealing an open end of cylindrically formed material having an interior surface comprising the steps of:
    a) inserting a heating element having a plurality of heating parts into said open end;
    b) expanding said heating parts within said open end into contact with said interior surface of the cylindrically formed material to cause the material at its open end to form overlapping material layers;
    c) pressing said overlapping layers onto said heating element to melt said interior surface about an interior perimeter of said cylindrically formed material;
    d) collapsing said heating parts and removing said heating element from said open end;
    e) pressing said overlapping layers together at said melted interior surface to seal said layers to each other.

4. The method of claim 3 including the step of thermally cutting said cylindrically formed material at said sealed layers adjacently along said melted interior surface.

5. A method of longitudinally sealing a bag comprising the steps of:
    a) providing an elongated mandrel having a longitudinally extending ridge, said mandrel having an indentation extending along said ridge;
    b) wrapping a sheet of material having interwoven filaments around said mandrel such that opposite edges of said sheet of material overlap one another at said ridge forming an outer material layer overlying said ridge and an inner material layer overlying said indentation;
    c) pressing inwardly on said sheet of material over said indentation to flex the edge of said outer material layer outwardly creating a gap between said outer material layer and inner material layer;
    d) inserting a heating element in said gap;
    e) pressing said overlapping edges onto said heating element to melt said edges;
    f) removing said heating element;
    g) pressing said overlapping melted edges together to cause said edges to seal to each other.

6. The method of claim 2 wherein step d) includes spacing said edges apart to form a gap therebetween.

7. The method of claim 2 wherein step f) includes inserting a heating element into said gap.

\* \* \* \* \*